United States Patent Office 2,700,685
Patented Jan. 25, 1955

2,700,685

HYDROGENATION OF A 1,3-DIOXAN TO 2,2,4-TRIMETHYL PENTAN-1,3-DIOL

Leslie Ernest Cooper and Richard Norman Lacey, Hull, England, assignors to British Industrial Solvents Limited, London, England, a British company No Drawing. Application January 10, 1951, Serial No. 205,434

Claims priority, application Great Britain January 19, 1950

7 Claims. (Cl. 260—632)

This invention relates to treating 5:5-dimethyl-2:4- di-isopropyl-6-hydroxy-1:3-dioxan, otherwise known as isobutyraldoxan with hydrogen.

The principal object of the invention is to provide a simple, efficient process for the treatment of isobutyraldoxan to produce 2:2:4-trimethyl pentan-1:3-diol and isobutanol.

The invention accordingly comprises the novel processes and steps of processes, specific embodiments of which are described hereinafter by way of example and in accordance with which I now prefer to practice the invention.

According to the present invention isobutyraldoxan in the liquid phase is treated with hydrogen at moderately elevated temperatures and under slightly acidic conditions and in the presence in the reaction mixture of a hydrogenation catalyst to give good yields of 2:2:4-trimethyl pentan-1:3-diol and isobutanol. Substantially pure isobutyraldoxan, which may be employed in carrying out the process of the present invention, is difficult to obtain free from isobutyraldol formed in the condensation of isobutyraldehyde. However, it is a feature of the present invention that the crude isobutyraldoxan obtained as the primary product in the alkali-catalysed condensation of isobutyraldehyde may be employed without purification either from unchanged isobutyraldehyde or isobutyraldol.

In a preferred embodiment of the present invention the hydrogenation catalyst employed is the easily accessible Raney nickel catalyst.

If the isobutyraldoxan employed is not itself acidic, the slightly acidic reaction conditions may be brought about by the addition of small quantities of a weak acid such as acetic, propionic butyric, isobutyric, succinic, malonic or adipic acid; strong acids such as phosphoric and trichloracetic acids being avoided since they frequently have a deleterious effect on the catalyst. The use of formic acid is to be avoided as it also has a deleterious effect on the catalyst. This slight acidity whereby the reaction conditions are obtained may also be brought about by the addition of the salts of weak bases and strong acids such as, for instance, salts of the alkaline earths with halogen acids. However, when using crude isobutyraldoxan dried over anhydrous calcium chloride, the raw material itself is frequently sufficiently acid for the purpose.

As the reaction is carried out in a non-aqueous i. e. substantially anhydrous medium no pH range can be given for the reaction conditions, but it is to be understood that only slightly acid conditions are necessary and that they may be brought about as described above.

The reaction proceeds readily with undiluted isobutyraldoxan but a diluent may be employed if desired, suitable materials being ethanol, isopropanol and isobutanol.

The temperature employed should lie between 30° and 130° C., and the preferred range is 50°–100° C. The use of temperatures higher than 130° C. should be avoided, since isobutyraldoxan tends to break down to isobutyraldehyde under these conditions.

The pressure in the hydrogenation apparatus is not a critical feature of the invention and accordingly atmospheric or superatmospheric pressures may be employed.

The 2:2:4-trimethyl pentan-1:3-diol may be recovered from the reaction mixture by any known process, preferably by distilling the crude reaction product under reduced pressure.

The following examples, in which the parts referred to are by weight, illustrate two embodiments of this invention:

*Example 1*

A mixture of 282 parts of crude isobutyraldoxan, 50 parts of a 50% Raney nickel paste in isopropanol and 5 parts of glacial acetic acid was agitated in an atmosphere of hydrogen for 8 hours, the temperature being raised gradually from 50° C. to 85° C. During this time approximately 4.5 parts of hydrogen were absorbed. Distillation of the product then gave an 80% yield of 2:2:4-trimethyl pentan-1:3-diol, boiling at 122° C. under 20 mm. Hg pressure, melting at 32–33° C. The melting point of this diol after recrystallisation from aqueous alcohol was 51° C.

Using the same starting material and catalyst but in the absence of the glacial acetic acid the reaction proceeded very slowly to absorb only .42 part of hydrogen in 90 minutes after which time the absorption ceased to proceed at a measurable rate. After the addition of the acid the absorption of hydrogen immediately restarted.

*Example 2*

272 parts of crude isobutyraldoxan, which had been dried under anhydrous calcium chloride before the removal of solvents, was treated with hydrogen as described in Example 1, no acid being added in this case. Approximately 4.3 parts of hydrogen were absorbed in 45 hours to give, on working up, a 71% yield of the diol and a 43% yield of isobutanol.

An important advantage of the method of this invention is that it affords a convenient method for the production of the diol which one would normally expect to obtain from the hydrogenation of isobutyraldol. However, this latter material canont be obtained readily in the pure form except through the distillation of isobutyraldoxan in the presence of acids. This is a difficult process and consequently isobutyraldol is an expensive and not readily available material.

We claim:

1. A process for the production of 2:2:4-trimethyl pentan-1:3-diol, which comprises treating 5:5-dimethyl-2:4-di-isopropyl-6-hydroxy-1:3-dioxan in the liquid phase in an atmosphere of hydrogen gas at a temperature between about 30–130° C. and under slightly acidic substantially hydrous conditions and in the presence in the reaction mixture of a hydrogenation catalyst to produce said diol and isobutanol.

2. A process as claimed in claim 1, wherein the starting material containing the 5:5-dimethyl-2:4-di-isopropyl-6-hydroxy-1:3-dioxan is the crude primary product obtained from the alkali-catalysed condensation of isobutyraldehyde.

3. A process as claimed in claim 1, wherein the said hydrogenation catalyst is Raney nickel.

4. A process as claimed in claim 1, wherein the said acid conditions are brought about by the addition of a weak acid selected from the group consisting of acetic, propionic, butyric, isobutyric, succinic, malonic and adipic acids.

5. A process as claimed in claim 2, wherein the said acidic conditions are brought about by drying the crude primary product over anhydrous calcium chloride.

6. A process as claimed in claim 1, wherein the hydrogenation is carried out in the presence of a diluent selected from the group consisting of ethanol, isopropanol and isobutanol.

7. A process for the production of 2:2:4-trimethyl pentan-1:3 diol, which comprises treating 5:5-dimethyl 2:4-di-isopropyl-6-hydroxy-1:3-dioxan at substantially atmospheric pressure, in the liquid phase in an atmosphere of hydrogen gas at a temperature of about 30–130° C. and under slightly acidic substantially anhydrous conditions and in the presence in the reaction mixture of a hydrogenation catalyst to produce said diol and isobutanol.

(References on following page)

References Cited in the file of this patent

UNITED STATES PATENTS

| | | |
|---|---|---|
| 2,307,894 | Mikeska | Jan. 12, 1943 |
| 2,546,019 | Smith | Mar. 20, 1951 |

OTHER REFERENCES

Jour. Am. Chem. Soc. 65, pages 1714–17 (1943) (article by Saunders et al.).

Gilman: "Organic Chem.," an advanced treatise, vol. 1, 2nd ed. (1947), pp. 822–823, John Wiley & Sons, New York, N. Y.

Baker et al.: Jour. Am. Chem. Soc., vol. 70, pp. 1490–1492 (1948), abstracted in Chemical Abstracts, vol. 42, page 6771.